United States Patent

[11] 3,611,848

| [72] | Inventors | Homer W. Sullivan<br>Gates Mills;<br>Colin V. Gegg, Lakewood, both of Ohio |
|---|---|---|
| [21] | Appl. No. | 836,821 |
| [22] | Filed | June 26, 1969 |
| [45] | Patented | Oct. 12, 1971 |
| [73] | Assignee | The Hill Acme Company<br>Cleveland, Ohio |

[54] TUBE-CUTTING MACHINE
10 Claims, 12 Drawing Figs.

[52] U.S. Cl. .................................................... 82/53.1
[51] Int. Cl. ..................................................... B23b 37/00
[50] Field of Search .......................................... 82/46, 47,
48, 53.1, 70.2, 72, 73, 75, 101

[56] References Cited
UNITED STATES PATENTS

| 2,772,733 | 12/1956 | Tornberg ..................... | 82/53.1 X |
| 3,029,674 | 4/1962 | Southwell et al. ............ | 82/53.1 |
| 3,165,034 | 1/1965 | Cvacho ........................ | 82/53.1 |
| 3,310,855 | 3/1967 | Orioli ........................... | 82/53.1 X |
| 3,332,675 | 7/1967 | Bandura et al. ............... | 82/53.1 |
| 3,369,432 | 2/1968 | Davis ............................ | 82/53.1 |
| 3,478,627 | 11/1969 | Marion ......................... | 82/101 |

*Primary Examiner*—Harrison L. Hinson
*Attorney*—Baldwin, Egan, Walling & Fetzer

ABSTRACT: A rotary cutter flying tube cutoff apparatus for continuously and automatically severing elongated stock into preselected lengths. The apparatus includes a rotary-type cutter encompassing the stock and mounted for reciprocation along a path of travel extending longitudinally of the stock. The stock is fed into the apparatus and into the rotary cutter along such path of travel at a predetermined rate. Means are provided for moving the rotary cutter along with the stock at said predetermined rate and for actuating the rotary cutter while the stock and cutter are moving. Adjusting devices are provided to cut the stock to any suitable preselected length and to cut stock of a wide range of diameters. The rotary cutter effects an exceptionally clean cut free of burrs and jagged edges.

TUBE-CUTTING MACHINE

This invention relates to flying shear cutoff machines and more particularly to a flying tube cutoff machine having a rotary cutter which cuts a moving continuous strip of stock "in flight" during displacement of the stock or the like to be cut.

There has long been a need for a highly effective flying shear or flying tube cutoff machine that continuously and automatically severs continuous tubing into predetermined lengths with a clean cut free of burrs and ragged edges.

The invention has particular application in a straighten and cut machine wherein the stock material is straightened as it enters such machine and then is fed to the cutter to be severed into predetermined lengths. Also, this operation may be performed as a final step in the process of manufacturing the stock, as said stock is ejected from a forming machine, and it is most advantageous to perform the cutoff operation without interrupting the travel of the stock.

The principal object of the present invention is the provision of a cutoff machine adapted to sever a continuous, elongated member into predetermined lengths as said member travels at a uniform speed in a direction longitudinal to itself.

Another object of this invention is to provide apparatus for cutting elongated metal tubing or pipe, which apparatus is coordinated with the movement of the pipe along a path of travel during the cutting operation.

Another object of this invention is the provision of cutting apparatus to be used in connection with the formation of a continuous pipe for cutting such pipe into successive lengths, which apparatus can be readily adjusted to cut different pipe lengths and is fully automatic in operation.

Another object of the invention is to provide apparatus for cutting continuous metal pipe whereby the pipe-cutting apparatus is moved along the path of the longitudinal movement of the pipe at the same speed thereas in order to achieve a complete and clean cutoff of the pipe.

It is still another object of the present invention to provide apparatus for automatically cutting and ejecting continuous metal pipe, wherein the apparatus may be adjusted to accommodate pipe of various diameters.

Another object is the provision of a cutoff machine of the character described having novel means exactly synchronizing the speed of the member being severed and the speed of the rotary cutter.

A further object is the provision, in a cutoff machine of the character described, of novel means whereby the machine is adjustable to sever the rodlike member into sections of any desired length with great accuracy.

Other objects are simplicity and economy of construction, efficiency and dependability of operation, and adaptability for use in a wide variety of applications in cutting many different materials of various diameters.

Briefly the foregoing objects are accomplished by the provision of a flying tube cutoff apparatus for severing moving elongated stock into predetermined lengths including a reciprocable rotary cutter encasing the stock and mounted for displacement along a path of travel (i.e., the cutter longitudinal axis) extending longitudinally of the stock. The rotary cutter is mounted on a longitudinally movable carriage which also carries a collet fixture that grasps the moving stock and travels along with it so that the rotary cutter and the stock move as a unit during the cutting operation. As such stock and rotary cutter are being so moved as a unit, means are provided to actuate the cutter to sever the stock into a predetermined length. The rotary cutter is continuously rotating and includes a cylindrical jaw guide, with a plurality of elongated jaws mounted in radially spaced relation in the jaw guide for radial reciprocation to a common centerpoint of the longitudinal axis of the rotary cutter. Each of the jaws has a rotatable cutting wheel operatively disposed on its inner end, such cutting wheels being mounted to cut in a common plane parallel to the transverse plane of the rotary cutter. The jaws are radially advanced inwardly in unison to the common centerpoint by separate cutoff unit cam levers, with each such lever being pivotally mounted intermediate its ends on the jaw guide for rotative movement in a plane containing the rotary cutter longitudinal axis. One end of each cam lever is pivotally secured to the outer end of its adjacent jaw, and the other end of each cam lever extends outwardly of the jaw guide. With this type of rotary cutter construction, a clean cut free of burrs and ragged edges is effected.

Means are provided for effecting radially outward movement in unison of the other ends of each of the cam levers whereby the cam levers advance the jaws radially inwardly to the common centerpoint to cut the stock thereat, such means including a yoke slide mounted on the carriage for reciprocal movement of the longitudinal axis of the rotary cutter opposite the cam levers. The other or outer end of each of the cam levers is formed into a cam surface portion. The yoke slide has its end facing the cam levers formed into a partially hemispherical configuration engageable with the cam surface portion of the cam levers.

Means are provided for moving the yoke slide (on the carriage) along the cutter longitudinal axis into engagement with the cam levers to move the outer ends of the cam levers radially outwardly, such means including the yoke slide having at least one yoke shoe rotatably secured thereon for rotation in a horizontal plane, a yoke arm having a slot formed in one of its ends for slidably receiving the yoke shoe therein, the other end of the yoke are being rotatably secured to a pivot bracket on the carriage for rotation in a horizontal plane, a pivot arm rigidly secured at one end to the other end of the yoke arm whereby movement of the other end of the pivot arm in one direction in a horizontal plane causes the yoke arm to act on the yoke shoe which, in turn, moves the yoke slide into engagement with the cam levers thereby moving the jaws inwardly to cut the stock.

Means for moving the other end of the pivot arm in the one direction includes an elongated cam track pivotally mounted on a pivot point intermediate its ends to the frame of the apparatus adjacent the rotary cutter for rotation in a horizontal plane. The pivot arm has a pivot arm roller rotatably and operatively disposed on its outer end, such cam track having a partially enclosed track for receiving the pivot arm roller for longitudinal movement therein. Air piston-cylinder means for pivoting the cam track about its pivot point is provided whereby the outer end of the pivot arms moves in the one direction to actuate the rotary cutter.

Thus, there is provided a highly efficient automatic, flying tube cutoff machine that continuously severs tubing into preselected lengths with a clean cut free of burrs and uneven edges.

Other objects and advantages of this invention will be apparent to those skilled in the art upon reference to the following disclosure and the accompanying drawings included as a part of the specification, and wherein:

Although the invention is shown and described herein with reference to cutting metal pipe, it will be understood that it may be employed to cut any type of elongated hollow object of cuttable material.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

In the drawings, like reference letters and numerals apply to similar parts throughout the several views. In FIGS. 1-10 there is shown a rotary cutter flying tube cutoff apparatus or machine M constructed in accordance with the invention. Generally, the present invention provides an apparatus which, in one form, is adapted to cooperate with means for moving the stock such as a roller straightener (not shown) of the type which discharges at a predetermined rate (from left to right in FIG. 1) continuous stock in the form of metal pipe or tubing 10 along a horizontal path of travel (on the rotary cutter longitudinal axis) that extends longitudinally of the tubing axis, such roller straightener being disposed to the left of the apparatus or machine M in FIGS. 1 and 2.

Figure 1:
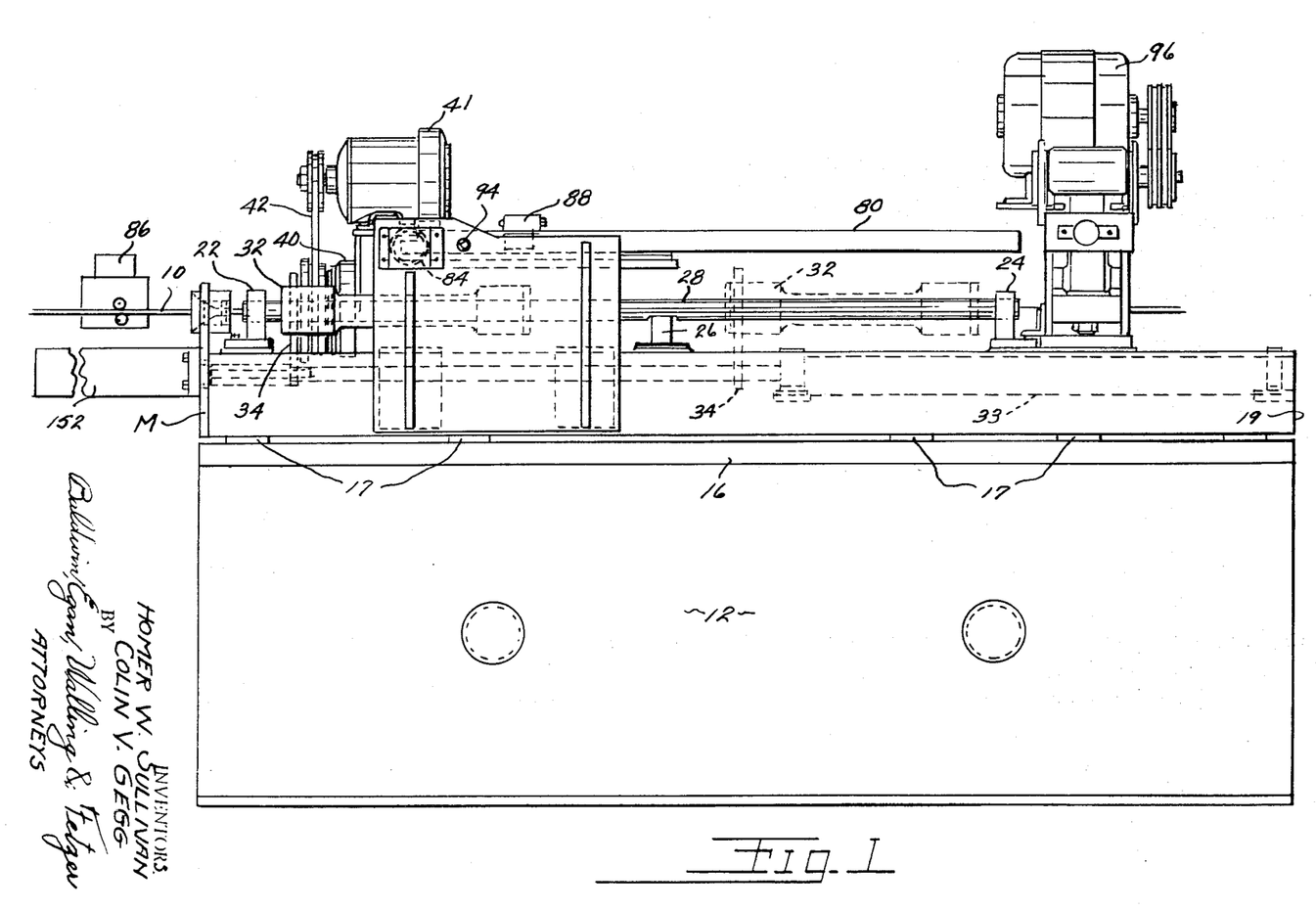
FIG. 1 is a side elevational view of a rotary cutter flying tube cutoff apparatus constructed in accordance with the invention.
Figures 2, 9, 10:
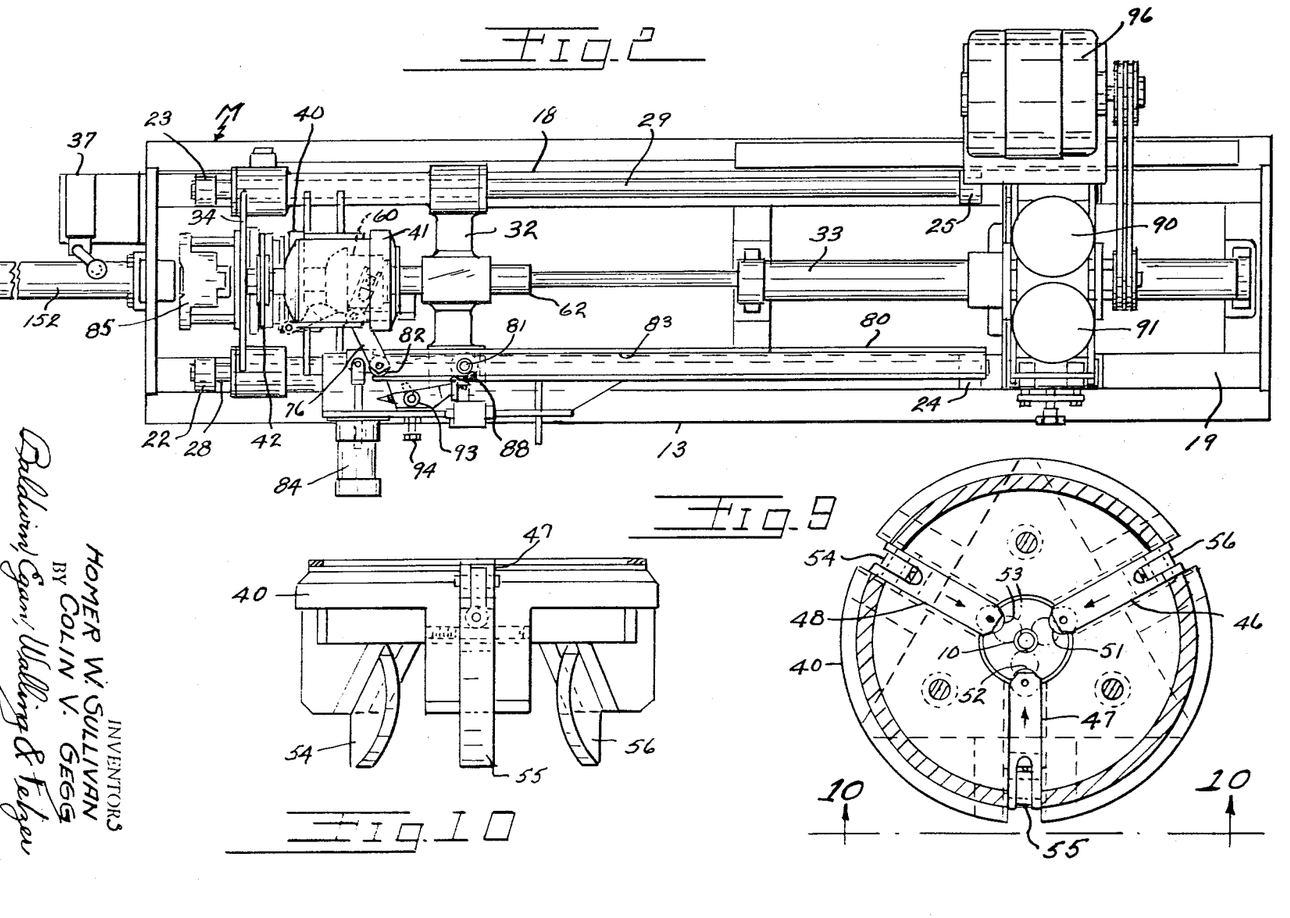
FIG. 2 is a top plan view of the apparatus shown in FIG. 1.
FIG. 9 is a view taken along the line 9—9 of FIG. 5.
FIG. 10 is a view taken along the line 10—10 of FIG. 9.
Figure 3:
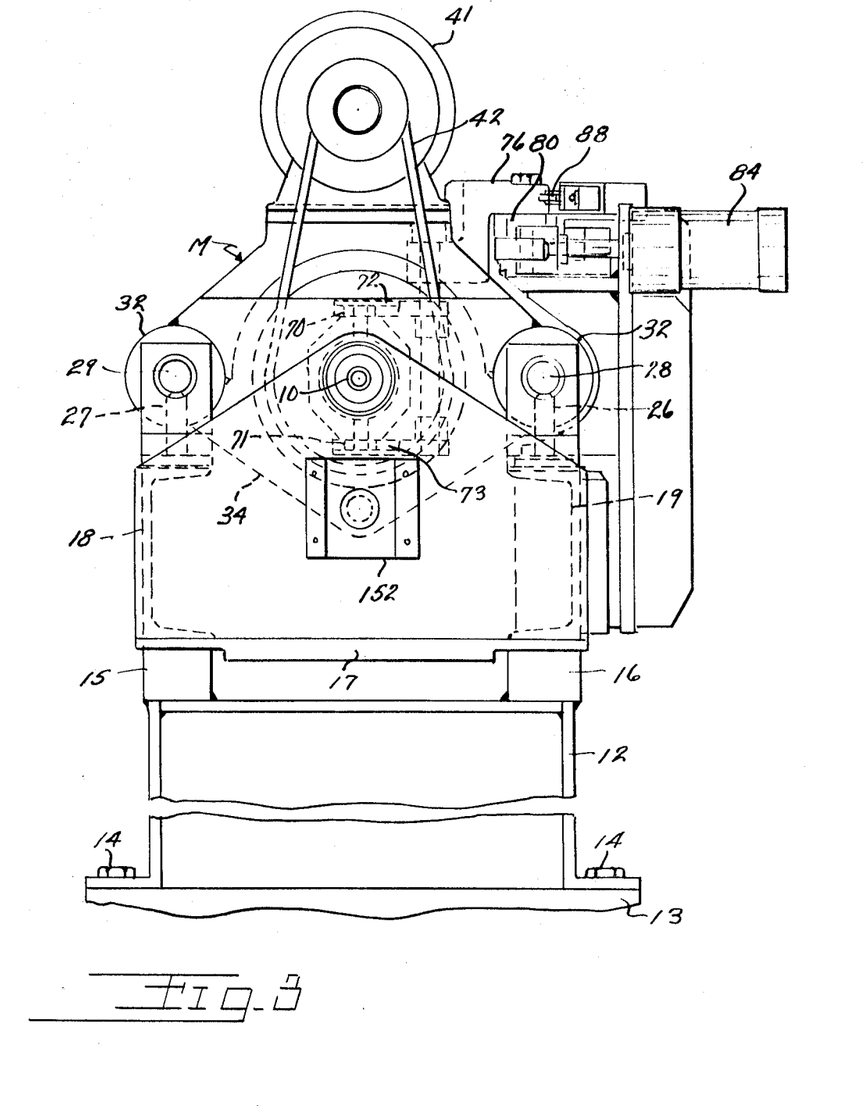
FIG. 3 is an enlarged left end elevational view of the apparatus shown in FIG. 1.

Referring first to FIGS. 1, 2 and 3, the machine M is mounted on a table 12 which may be secured to the floor 13 with the bolts 14. The table 12 carries two spaced longitudinal beams 15, 16 on which are mounted a plurality of crossbeams 17. The base of the machine includes two spaced frames or frame members 18, 19 disposed on the crossbeams 17.

Mounted to the base or frame members 18, 19 is a carriage mount including left end mounts 22, 23, right end mounts 24, 25, center supports 26, 27 all of which support a pair of spaced bars or ways 28 and 29. Slidably mounted on the ways 28, 29 is a movable carriage 32, which is reciprocated on the ways by the piston-cylinder mechanism 33 which is connected to the carriage by the b racket 34.

Disposed on the movable carriage 32 is a rotary cutter or cutoff unit 40, which is continuously rotated (preferably at 1725 r.p.m.) about its longitudinal axis by the motor 41 via the pulley belt 42. The rotary cutter 40 includes a cylindrical jaw guide 45 (FIGS. 9 and 10) containing a plurality of elongated jaws 46, 47, 48 mounted in radial spaced relation in the jaw guide for radial reciprocation in unison to a common centerpoint of the longitudinal axis 50 of the rotary cutter. Each of the jaws has a rotatable cutting wheel 5, 52, 53, respectively disposed on its inner end, such wheels being mounted to cut in a common plane parallel to the transverse plane of the rotary cutter.

It will be understood that the carriage 32 and its piston-cylinder mechanism 33 constitute one form of means for reciprocating or moving the rotary cutter 40 along with the stock in the aforementioned path of travel on the cutter longitudinal axis.

Means are provided for radially advancing the jaws 46, 47, 48 in unison to the common centerpoint in the form of three separate cutoff unit cam levers 54, 55, 56 (FIG. 10). Since the mounting details of all levers are identical, only one will be described. Each cam lever is pivotally mounted intermediate its ends at the point 57 (FIG. 5) on the jaw guide 45 for rotative movement in a plane containing the longitudinal centerline or axis 50, with one end of each lever being pivotally secured to the outer end of its coacting adjacent jaw, and with the other end of each lever extending outwardly or to the right of the jaw guide. Thus, when the outer ends of the levers are moved radially outwardly in unison, the cutter jaws are advanced radially inwardly to cut the stock 10 at the common centerpoint.

Means for effecting the radially outward movement of the outer ends of the cam levers 54, 55, 56 include a yoke slide 60 (FIG. 5) mounted for reciprocal movement on the tube 62 of the carriage 32 and on the longitudinal axis 50 opposite the cam levers. The outer or right end of each of the cam levers is formed into a cam surface portion 55a, said yoke slide having its end facing the cam levers formed into a partially hemispherical configuration 60a engageable with the cam surface portion 55a of the cam levers. Thus, moving the yoke slide 60 to the left along the longitudinal axis 50 into engagement with the cam levers causes the cam levers to move radially outwardly thereby moving the jaws 46, 47, 48 radially inwardly to cut the stock 10. The yoke slide 60 is slidably mounted on the tube 62, which is secured and forms a part of the carriage 32. Disposed within the tube 62 is a smaller tube 64 adapted to receive the stock 10 therethrough. The tube 64 is replaceable and is provided in different sizes (i.e., different interior diameters) to accommodate various size stock.

In the structure thus for described, the carriage 32 is reciprocable along the stock path of travel and in a horizontal plane, said carriage carrying the rotary cutter 40 and the yoke slide 60. Means for moving the yoke slide 60 into engagement with the cam levers 54, 55, 56 while the carriage is moving to the right includes said yoke slide having yoke shoes 70 and 71 (FIGS. 3 and 6) rotatably secured to the top and bottom of the yoke slide for rotation in a horizontal plane, and a bifurcated yoke arm 69 having slots 72, 73 formed in its ends for slidably receiving said yoke shoes, respectively, therein. The other (single) end of the yoke arm 69 is rotatably secured at the point 74 to a pivot bracket 75 on the carriage for rotation in a horizontal plane. A pivot arm 76 is rigidly secured at one end to the other end of the yoke arm 69 at the point 74 whereby movement of the other or outer end of the pivot arm 76 in one direction in a horizontal plane causes the yoke arm 69 to act on the yoke shoes 70, 71 which, in turn, move the yoke slide 60 into engagement with the cam levers 54, 55, 56 thereby moving the jaws 46, 47, 48 inwardly to cut the stock 10.

Means for selectively moving the other or outer end of the pivot arm 76 include an elongated cam track 80 pivotally mounted on a pivot point 81 (FIG. 5) intermediate its ends to the apparatus frame adjacent the rotary cutter 40 for rotation in a horizontal plane. The pivot arm 76 has a pivot arm roller 82 rotatably and operatively disposed on its other or outer end, said cam track 80 having a partially enclosed track 83 for rollingly receiving the pivot arm roller 82 for longitudinal movement therein. Means for pivoting the cam track 80 about its pivot point 81 are provided whereby the other or outer end of the pivot arm 76 moves in the one direction to actuate the rotary cutter, such means including a piston-cylinder mechanism 84 (FIG. 6).

A collet 85 is secured to the carriage 32 and is adapted to grasp the stock 10 at a preselected moment so that the stock and carriage move to the right (FIGS. 1, 2, 4, 5, 6 and 7) as a unit.

Figure 4:
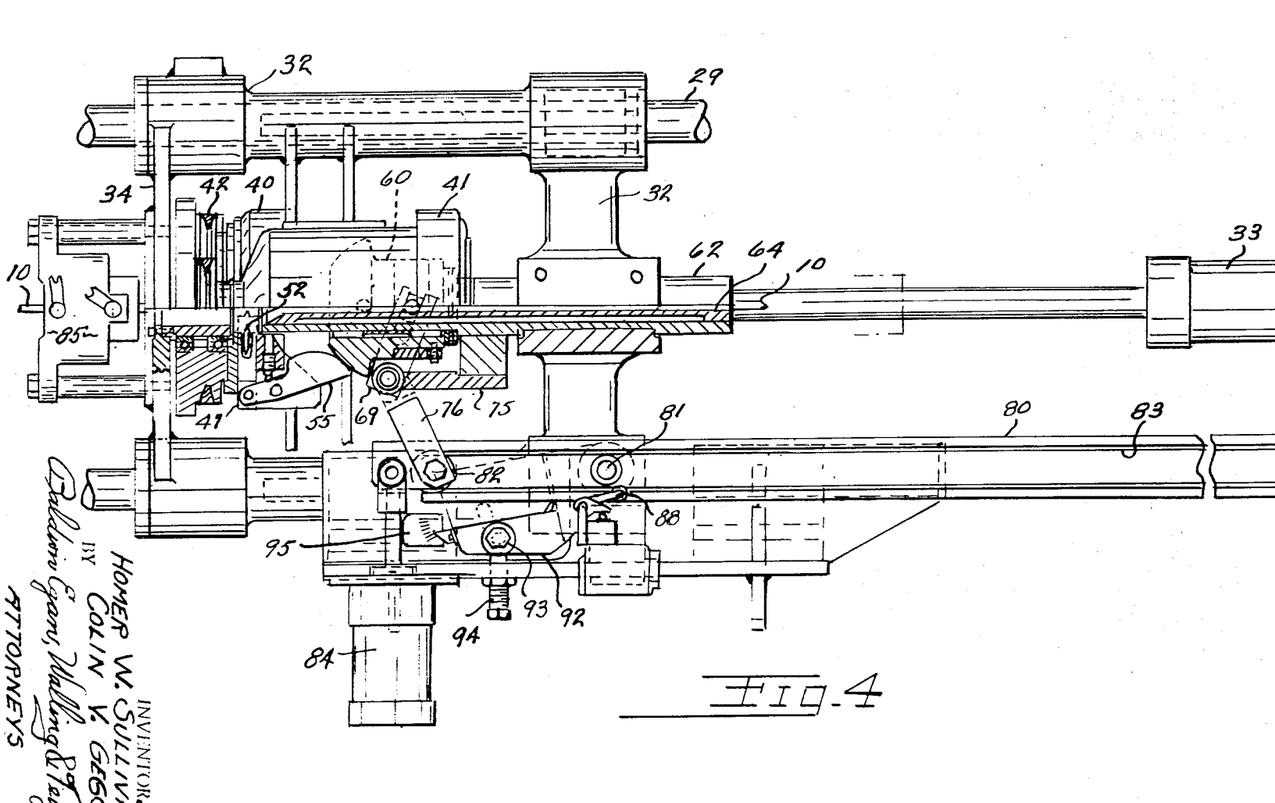
FIG. 4 is an enlarged top view of the carriage portion of the apparatus shown in FIG. 1 and showing the parts in position during the first sequence of operation.
Figure 5:
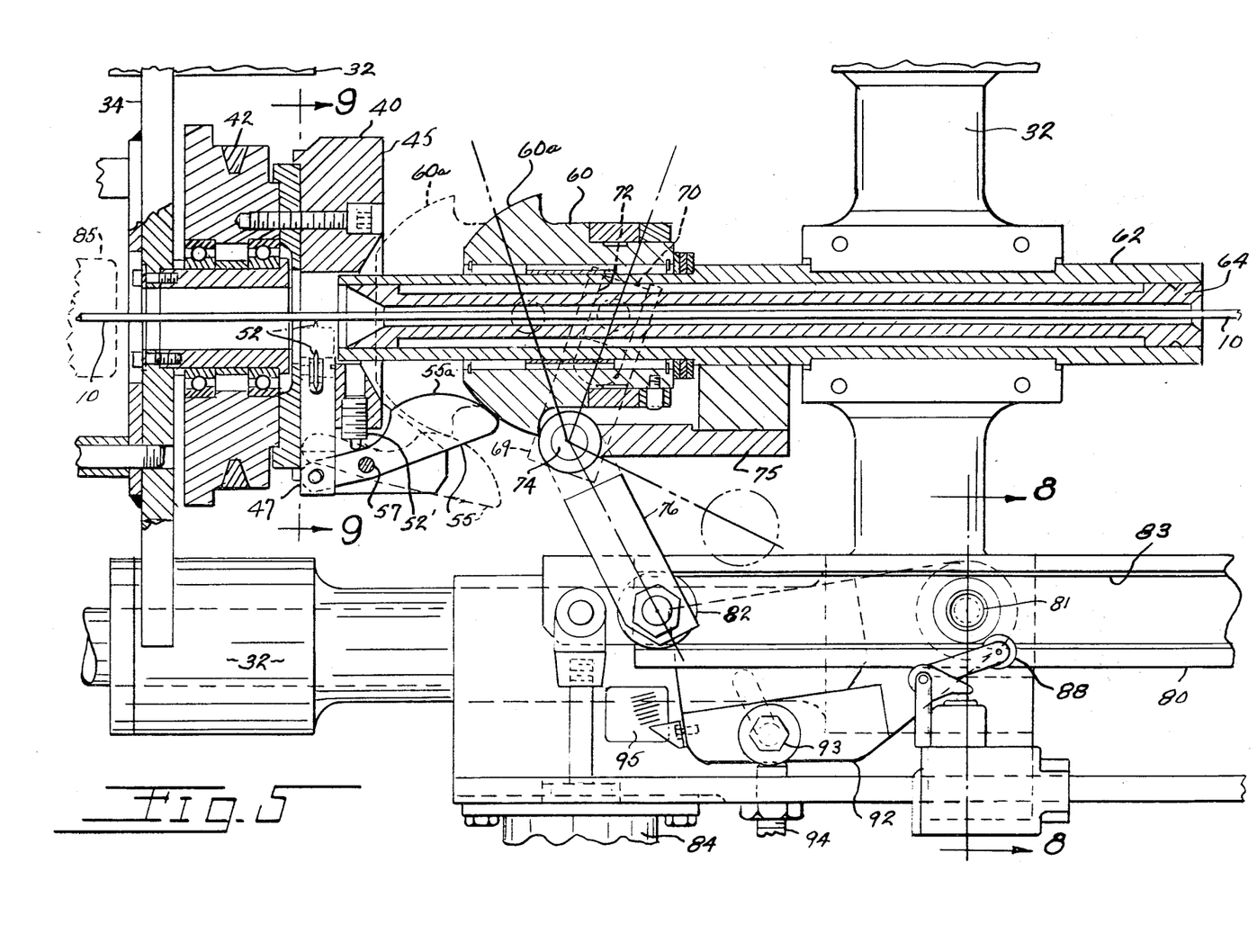
FIG. 5 is an enlarged view of FIG. 4.
Figures 6, 8:
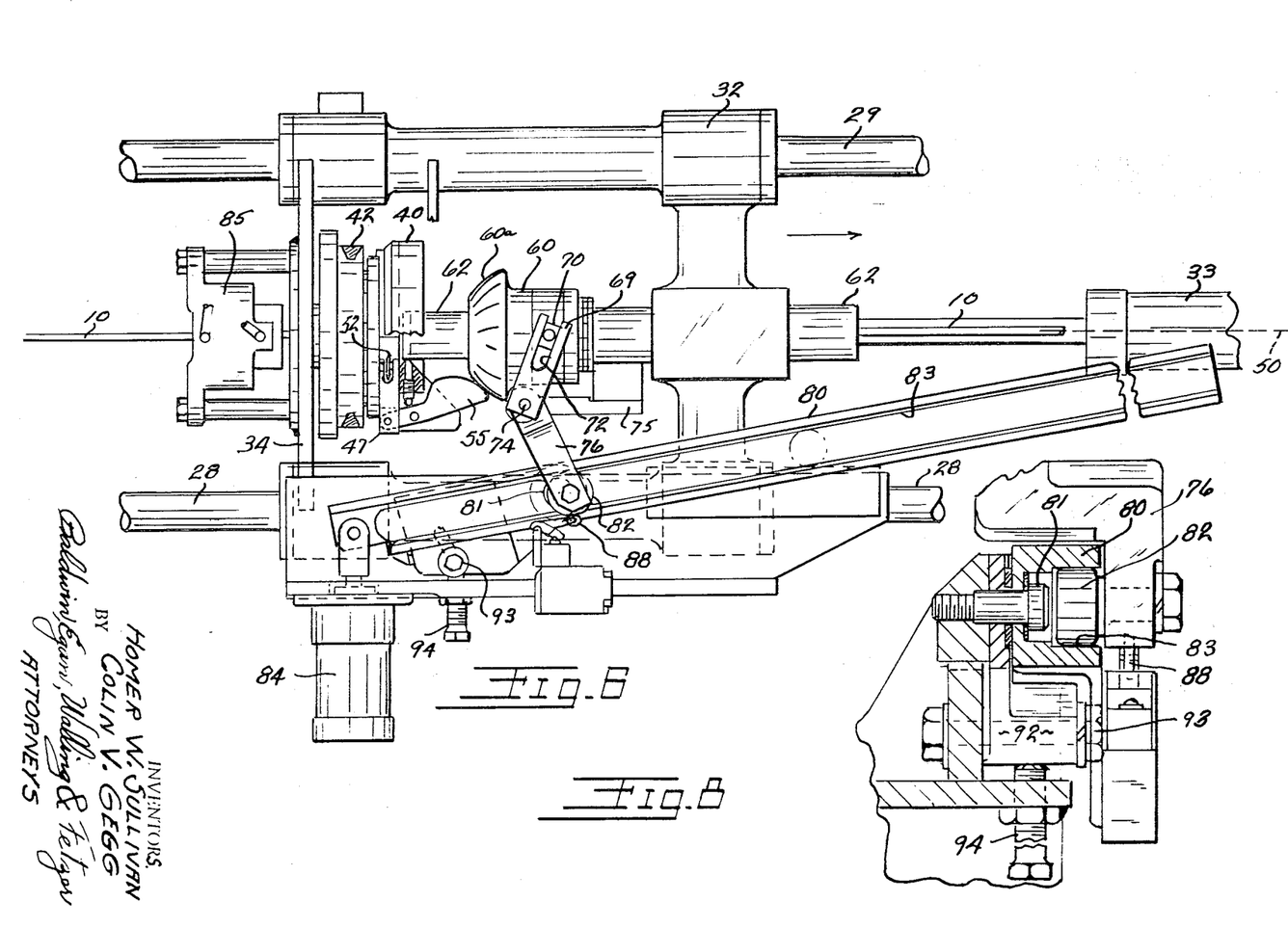
FIG. 6 is a view similar to FIG. 5, but showing the parts in position during the second sequence of operation.
FIG. 8 is a view taken along the line 8—8 of FIG. 5.
Figure 7:
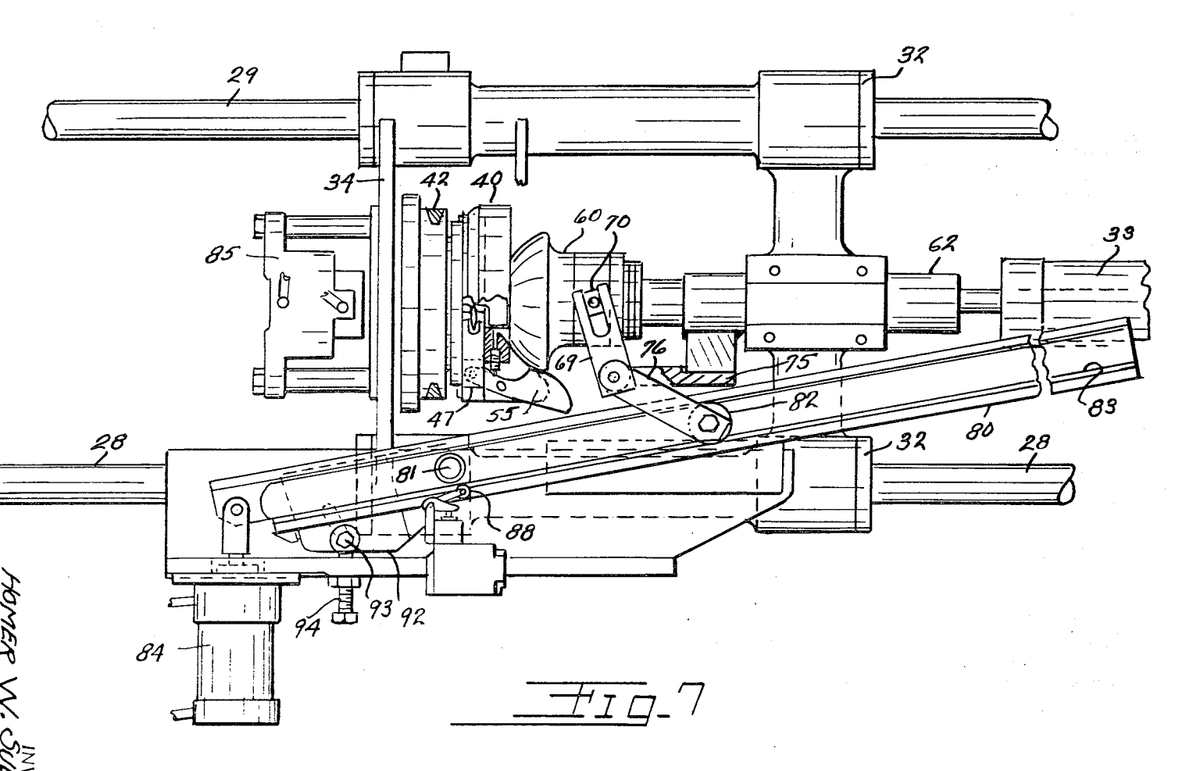
FIG. 7 is a view similar to FIG. 5, but showing the parts in position during the third sequence of operation.

In operation, the parts are initially disposed in the position shown in FIGS. 4 and 5 wherein the stock 10 is moving to the right at a preselected speed. When the stock measuring device 86 (FIG. 1) measures a preselected length, it actuates the collet fixture 85 which grasps the stock 10 and thence actuates the carriage cylinder 33. The carriage 32 (with the rotary cutter 40 and collet 85 thereon) and the stock move to the right (as a unit) in FIGS. 1, 2, 4, 5, 6 and 7. The initial sequence is shown in FIGS. 4 and 5 wherein the cam track 80 is disposed parallel to the stock 10 and the pivot arm wheel 82 is at the left end of the track 83. The second sequence is shown in FIG. 6 wherein the wheel 82 has traveled to the right in the track 83 and has actuated the yoke slide trigger 88 which actuates the cam track piston cylinder mechanism 84 to dispose the cam track 80 at an angle in the position shown. The third sequence is shown in FIG. 7 wherein the roller travels further to the right in the track 83 and the pivot arm 76 and pivot bracket 75 are pivoted as a unit to push the yoke slide 60 to the left and actuate the rotary cutter 40 as aforedescribed to cut the stock. The carriage piston cylinder 33 then returns the carriage to the initial position of FIGS. 4 and 5 to start another cycle. Drive rollers 90 and 91 (FIG. 2) (driven by the stock drive roller motor 96) pull the cut stock to the right and away from the machine. The rollers 90 and 91 move the stock out at a slightly faster speed than the stock is fed into the apparatus to avoid jamming of the cut pieces in the machine.

A cam track adjustable stop 92 (FIG. 5) is provided which is adjusted by the adjusting screws 93, 94 in coaction with the scale 95 for limiting cutter penetration of the stock 10.

It will be noted that the cam levers 54, 55 and 56 are normally biased to a noncutting position to normally position the jaws 46, 47 and 48 and their cutting wheels away from the stock. For example, the lever 55 (FIG. 5) is so biased by a compressed coil spring in the center of the sleeve 52.

Also included is an automatic part cutoff unit 37 (FIG. 2) disposed on the apparatus and contacting the stock before it enters the rotary cutter to sense uneven portions of the stock and actuate the rotary cutter to cut off such uneven portions of the stock.

Figure 11:
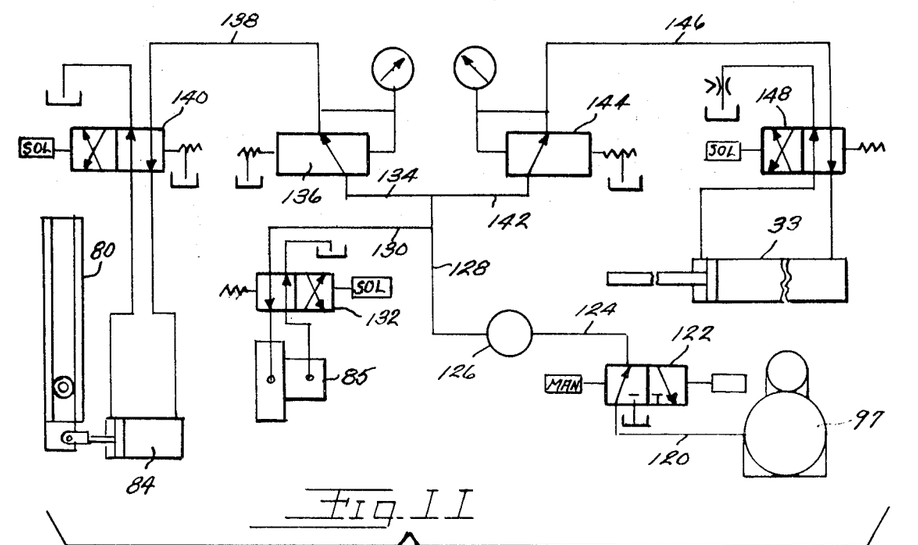
FIG. 11 is a schematic diagram of the fluid control system of the apparatus.

Referring to FIG. 11, there is shown the hydraulic control system of the apparatus which includes an air compressor 97 which feeds pressurized air through the line 120 to a two-way manually operated valve 122 for controlling the flow of pressurized air to the rest of the control system. From the valve 122 pressurized air goes to the line 124, through a lubricator 126, and to the line 128. From the line 128, air goes to the line 130 to a four-way receiving valve 132 and thence to the collet 85.

Also from the line 128, air goes through the line 134, through a pressure regulator 136, thence to the line 138 to a four-way reversing valve 140 which controls the cam track cylinder 84.

Also from the line 128 air goes to the line 142 to the regulator 144, thence to the line 146 to the four-way reversing valve 148 which controls the carriage cylinder 33.

A buffer or shock absorber 152 (FIG. 2) is provided to cushion the return stroke of the carriage.

Figure 12:
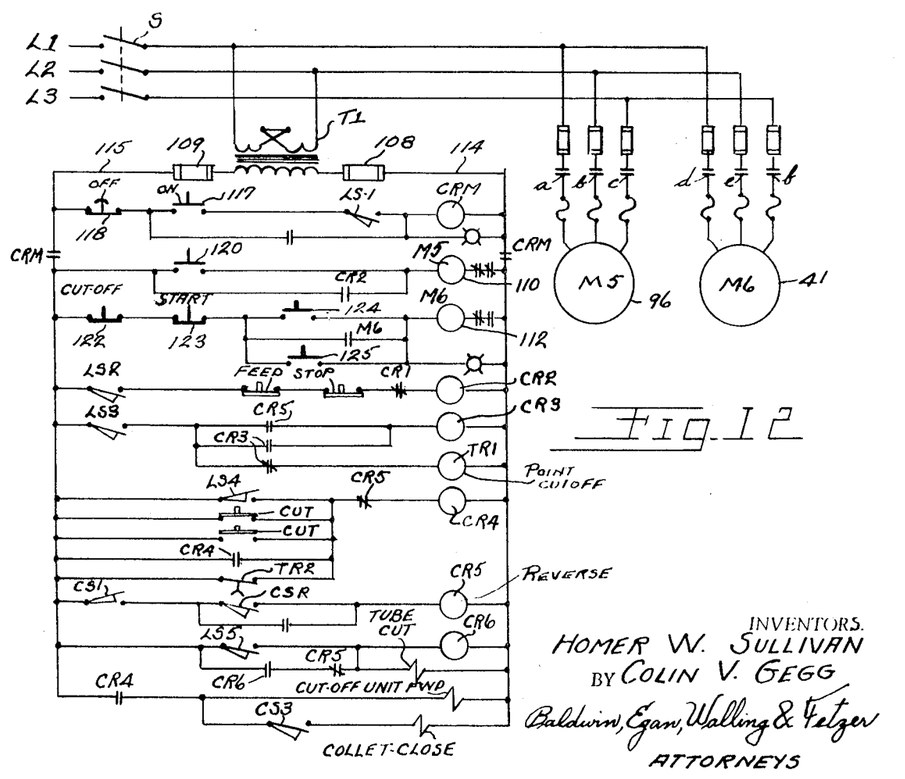
FIG. 12 is a wiring diagram of the electrical control system of the apparatus.

Referring to FIG. 12, there is shown a suitable electrical control system for controlling the cyclical operation of the machine M. Only the main components will be described as such electrical system, per se, forms no part of the novelty of the invention.

As shown, the electrical control system is connected by way of a transformer T1 across one phase of a three-phase primary identified as L1, L2, and L3, which may be controlled by a conventional main switch S.

The flying cutter motor 41 and the stock drive roller motor 96 are connected to the three-phase system in conventional manner. The roller motor 96 has in each of its three lines a normally open relay contact a, b, c, which functions with the coil of relay 110 to connect the motor 96 to the three-phase system. In like manner, the motor 41 has in each of its lines a normally open relay contact identified as d, e, f, each of which is controlled by the coil of the relay 112 to control the motor 41.

The secondary winding of the transformer T1 is connected to the conductors 114, 115 through the fuses 108, 109, such conductors 114, 115 being the main conductors (in parallel connection) of the electrical control system.

The control system includes a main control relay CRM, which is the main control for the apparatus. As shown, one end of relay CRM is connected to conductor 114 and its opposite end to one side of normally open switch LS1. The opposite side of LS1 is connected to one side of normally open pushbutton 117, with the opposite side of pushbutton 117 being connected to one side of normally closed pushbutton switch 118. The opposite side of switch 118 is connected to conductor 115, whereby said main control relay CRM is connected across the secondary of transformer T1.

In like manner, additional components are wired into the circuit in conventional form. For example, the normally open pushbutton 120 controls the roller motor 96, and the pushbuttons 122, 123, 124 and 125 control the cutter motor 41, as shown.

Thus, there is provided a rotary cutter flying tube cutoff machine that continuously and automatically severs elongated tubular stock into preselected lengths with a clean cut free of burrs and jagged edges.

We claim:
1. An apparatus for severing associated elongated hollow cylindrical tube stock into predetermined lengths comprising;
 a. means for moving the stock axially at a predetermined rate in one direction along a path of travel extending longitudinally of the stock;
 b. an elongated rotating rotary cutter encompassing said stock, said stock moving along the longitudinal axis of the rotary cutter;
 c. means for moving the rotary cutter along with the stock in said one direction and at said predetermined rate;
 d. means for actuating the rotary cutter to cut the stock while the stock and rotary cutter are moving in said direction and at said rate; means for reversing the direction of travel of the rotary cutter and returning it to a predetermined position along said path of travel after such rotary cutter is actuated to again commence a cutting cycle and cut the stock into a predetermined length; means for rotating said rotary cutter about its longitudinal axis; said rotary cutter including a cylindrical jaw guide, a plurality of elongated jaws mounted in radially spaced relation in said jaw guide for radial reciprocation to a common centerpoint on said longitudinal axis, each of said jaws having a rotatable cutting wheel operatively disposed on its inner end, said cutting wheels being mounted to cut in a common plane parallel to the transverse plane of the rotary cutter, means for radially advancing said jaws in unison to the common centerpoint to cut the associated stock thereat, each of said jaws being radially advanced inwardly to the common centerpoint by separate cutoff unit cam levers, each such lever pivotally mounted intermediate its ends on the jaw guide for rotative movement in a plane containing said longitudinal centerline, one end of each cam lever being pivotally secured to the outer end of its coacting adjacent jaws, the other end of each cam lever extending outwardly of the jaw guide, means for effecting radially outward movement in unison of the other ends of each of the cam levers whereby the cam levers advance the jaws radially inwardly to the common centerpoint to cut the stock thereat, said means for effecting the radially outward movement of the outer ends of the cam levers including a yoke slide mounted for reciprocal movement on said longitudinal axis opposite said cam levers, the other end of each of said cam levers being formed into a cam surface portion, said yoke slide having its end facing the cam levers formed into a partially hemispherical configuration engageable with the cam surface of the cam levers, and means for moving said yoke slide along said longitudinal axis into engagement with the cam levers to move the other ends of the cam levers radially outwardly thereby moving the jaws radially inwardly to cut the stock.

2. The structure of claim 1 and further including a carriage reciprocable along said path of travel in a horizontal plane, said carriage carrying said rotary cutter and said yoke slide, said means for moving the yoke slide into engagement with the levers including said yoke slide having a yoke shoe rotatably secured to the yoke slide for rotation in a horizontal plane, a yoke arm having a slot formed in one of its ends for slidably receiving said yoke shoe therein, the other end of said yoke arm being rotatably secured to the carriage for rotation in a horizontal plane, a pivot arm rigidly secured at one end to the other end of said yoke arm whereby movement of the other end of the pivot arm in one direction in a horizontal plane causes the yoke arm to act on the yoke shoe which, in turn, moves the yoke slide into engagement with the cam levers thereby moving the jaws inwardly to cut the stock, and means for moving the other end of the pivot arm in the one direction.

3. The structure of claim 2 wherein the carriage is reciprocably mounted on a frame and said means for moving the other end of the pivot arm in the one direction includes, an elongated cam track pivotally mounted on a pivot point intermediate its ends to the frame adjacent the rotary cutter for rotation in a horizontal plane, said pivot arm having a pivot arm roller rotatably and operatively disposed on its other end, said cam track having a partially enclosed track for receiving said pivot arm roller for longitudinal movement therein, and means for pivoting the cam track about its pivot point whereby the other end of the pivot arm moves in the one direction to actuate the rotary cutter.

4. The structure of claim 3 and further including a collet fixture mounted on the carriage for grasping the moving stock to move the rotary cutter along with the stock along the longitudinal axis of the rotary cutter, and means for actuating the collet fixture.

5. The structure of claim 3 and further including means for adjusting the degree of pivoting of the cam track to adjust the depth of cut of the rotary cutter for cutting stock of preselected diameter.

6. The structure of claim 5 and further including a yoke slide trigger mounted adjacent the cam track for actuating the means for pivoting the cam track, said pivot arm roller actuating said trigger at a predetermined point in its travel in the cam track.

7. The structure of claim 2 wherein said yoke slide has a yoke rotatably mounted thereon for rotation about the yoke slide in a plane transverse to the longitudinal axis of the yoke slide, said yoke shoe being mounted on said yoke, whereby the yoke slide may rotate about its longitudinal axis when it contacts said cutoff unit cam levers.

8. The structure of claim 7 and further including a second yoke shoe mounted on said yoke radially opposite said first yoke shoe, said yoke arm being bifurcated wherein its two ends are operatively secured to said yoke shoes respectively.

9. The structure of claim 1 wherein said cam levers are biased to noncutting position to normally position the jaws and their cutting wheels away from the stock.

10. The structure of claim 1 further including an automatic part cutoff unit disposed on the apparatus and contacting the stock before it enters the rotary cutter to sense uneven portions of the stock and actuate the rotary cutter actuating means to cut off such uneven portions of the stock.